US010829076B2

(12) United States Patent
Takahashi (10) Patent No.: US 10,829,076 B2
(45) Date of Patent: Nov. 10, 2020

(54) REAR SEAT SIDE AIRBAG DEVICE

(71) Applicant: TOYOTA JIDOSHA KABUSHIKI KAISHA, Toyota (JP)

(72) Inventor: Naoki Takahashi, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 114 days.

(21) Appl. No.: 16/144,114

(22) Filed: Sep. 27, 2018

(65) Prior Publication Data

US 2019/0135218 A1 May 9, 2019

(30) Foreign Application Priority Data

Nov. 9, 2017 (JP) .................................. 2017-216559

(51) Int. Cl.
*B60R 21/21* (2011.01)
*B60R 21/207* (2006.01)
*B60R 21/215* (2011.01)
*B60R 21/2338* (2011.01)
*B60R 21/231* (2011.01)
*B60R 21/00* (2006.01)

(52) U.S. Cl.
CPC ............ *B60R 21/207* (2013.01); *B60R 21/21* (2013.01); *B60R 21/215* (2013.01); *B60R 21/2338* (2013.01); *B60R 21/23138* (2013.01); *B60R 2021/0006* (2013.01); *B60R 2021/2078* (2013.01); *B60R 2021/21512* (2013.01); *B60R 2021/23153* (2013.01); *B60R 2021/23382* (2013.01)

(58) Field of Classification Search
CPC . B60R 21/207; B60R 21/21; B60R 21/23138; B60R 2021/2078; B60R 21/23153
See application file for complete search history.

(56) References Cited

U.S. PATENT DOCUMENTS

| | | | | | |
|---|---|---|---|---|---|
| 5,222,761 | A | * | 6/1993 | Kaji ....................... | B60R 21/017 280/730.2 |
| 5,564,735 | A | * | 10/1996 | Boy ........................ | B60R 21/21 280/730.2 |
| 5,746,443 | A | * | 5/1998 | Townsend ............... | B60R 21/20 280/730.2 |
| 5,911,434 | A | * | 6/1999 | Townsend ................. | B60J 5/06 280/730.2 |
| 5,921,576 | A | * | 7/1999 | Sinnhuber ............... | B60R 21/21 280/728.2 |

(Continued)

FOREIGN PATENT DOCUMENTS

| | | |
|---|---|---|
| JP | 2006-088850 A | 4/2006 |
| JP | 2010-120407 A | 6/2010 |

(Continued)

*Primary Examiner* — Barry Gooden, Jr.
(74) *Attorney, Agent, or Firm* — Oliff PLC (57) ABSTRACT

A rear seat side airbag device that includes: an inflator that generates gas in the event of a vehicle collision; and a side airbag that is supplied with gas from the inflator from a position in a vehicle cabin side portion that corresponds to a rear seat, and that is inflated and deployed towards a portion on an outer side in a vehicle width direction of a vehicle occupant in a case in which the vehicle occupant is sitting in the rear seat.

7 Claims, 7 Drawing Sheets

(56) References Cited

U.S. PATENT DOCUMENTS

| | | | | |
|---|---|---|---|---|
| 6,612,611 | B1* | 9/2003 | Swann | B60R 21/21 280/729 |
| 8,651,518 | B2* | 2/2014 | Shamoto | B60N 2/289 280/730.2 |
| 9,758,122 | B2* | 9/2017 | Fujiwara | B60R 21/231 |
| 9,796,353 | B2* | 10/2017 | Fujiwara | B60R 21/23138 |
| 9,925,947 | B2* | 3/2018 | Fujiwara | B60R 21/215 |
| 9,969,351 | B2* | 5/2018 | Ohno | B60R 21/239 |
| 9,994,183 | B2* | 6/2018 | Fujiwara | B60R 21/23138 |
| 10,005,418 | B2* | 6/2018 | Ito | B60N 2/015 |
| 2001/0042975 | A1* | 11/2001 | David | B60R 21/21 280/730.2 |
| 2003/0146607 | A1* | 8/2003 | Ohki | B60R 13/025 280/730.2 |
| 2005/0121886 | A1* | 6/2005 | Bossenmaier | B60R 21/20 280/730.2 |
| 2006/0061073 | A1* | 3/2006 | Naruse | B60R 21/21 280/730.2 |
| 2006/0113764 | A1* | 6/2006 | Tracht | B60R 21/207 280/730.2 |
| 2006/0255572 | A1* | 11/2006 | Svenbrandt | B60R 21/233 280/730.2 |
| 2008/0284143 | A1* | 11/2008 | Smith | B60R 21/207 280/730.2 |
| 2009/0039623 | A1* | 2/2009 | Kawabe | B60R 21/207 280/728.3 |
| 2009/0184501 | A1* | 7/2009 | Hirotani | B60J 5/0451 280/730.2 |
| 2010/0090448 | A1* | 4/2010 | Pursche | B60R 21/268 280/730.2 |
| 2012/0217730 | A1* | 8/2012 | Baba | B60R 21/23138 280/729 |
| 2013/0009431 | A1* | 1/2013 | Acker | B60R 21/207 297/216.13 |
| 2013/0175792 | A1* | 7/2013 | Fukawatase | B60N 2/289 280/728.2 |
| 2013/0187416 | A1* | 7/2013 | Nakata | B60R 21/207 297/216.13 |
| 2013/0200599 | A1* | 8/2013 | Shamoto | B60N 2/289 280/730.2 |
| 2014/0077480 | A1* | 3/2014 | Festag | B60R 21/207 280/728.3 |
| 2014/0265271 | A1* | 9/2014 | Dinsdale | B60R 21/23138 280/730.2 |
| 2014/0291974 | A1* | 10/2014 | Nii | B60R 21/207 280/730.1 |
| 2015/0061266 | A1* | 3/2015 | Jordan | B60R 13/0237 280/728.3 |
| 2016/0009247 | A1* | 1/2016 | Fujiwara | B60R 21/2171 280/728.2 |
| 2016/0009248 | A1* | 1/2016 | Tanabe | B60R 21/276 280/728.2 |
| 2016/0068129 | A1* | 3/2016 | Tanabe | B60R 21/216 280/728.3 |
| 2016/0101760 | A1* | 4/2016 | Fujiwara | B60R 21/2334 280/728.3 |
| 2016/0176377 | A1* | 6/2016 | Jenny | B60R 21/213 280/730.2 |
| 2016/0200280 | A1* | 7/2016 | Fujiwara | B60N 2/42 280/729 |
| 2016/0221528 | A1* | 8/2016 | Sugimura | B60R 21/23138 |
| 2016/0244018 | A1* | 8/2016 | Zimmermann | B60R 21/207 |
| 2016/0264091 | A1* | 9/2016 | Fujiwara | B60R 21/2346 |
| 2017/0021793 | A1* | 1/2017 | Ito | B60N 2/015 |
| 2017/0036635 | A1* | 2/2017 | Tanabe | B60R 21/207 |
| 2017/0066400 | A1* | 3/2017 | Fujiwara | B60R 21/23138 |
| 2017/0072894 | A1* | 3/2017 | Fujiwara | B60R 21/231 |
| 2017/0072900 | A1* | 3/2017 | Fujiwara | B60R 21/23138 |
| 2017/0174169 | A1* | 6/2017 | Tanabe | B60R 21/23138 |
| 2017/0174174 | A1* | 6/2017 | Ohno | B60R 21/239 |
| 2018/0086299 | A1* | 3/2018 | Kalinowski | B60R 21/21 |
| 2018/0194318 | A1* | 7/2018 | Hioda | B60R 21/23184 |
| 2018/0222427 | A1* | 8/2018 | Tanabe | B60R 21/207 |
| 2019/0001914 | A1* | 1/2019 | Yaegashi | B60R 21/207 |
| 2019/0077355 | A1* | 3/2019 | Hioda | B60R 21/207 |
| 2019/0168703 | A1* | 6/2019 | Sato | B60R 21/2338 |
| 2020/0094771 | A1* | 3/2020 | Jost | B60R 21/0136 |

FOREIGN PATENT DOCUMENTS

| | | |
|---|---|---|
| JP | 2016-020148 A | 2/2016 |
| JP | 2017-035907 A | 2/2017 |
| WO | 2012/053082 A1 | 4/2012 |

* cited by examiner

REAR SEAT SIDE AIRBAG DEVICE

CROSS-REFERENCE TO RELATED APPLICATION

This application is based on and claims priority under 35 USC 119 from Japanese Patent Application No. 2017-216559 filed on Nov. 9, 2017, the disclosure of which is incorporated by reference herein.

BACKGROUND

Technical Field

The present disclosure relates to a rear seat side airbag device.

Related Art

A side airbag device is disclosed in Japanese Unexamined Patent Application (JP-A) No. 2006-088850. This side airbag device is housed inside a case that is provided in a seat side garnish (hereinafter, referred to as a 'side garnish') that is provided between a seatback of a rear seat and a vehicle side portion. Additionally, an airbag door which is enclosed by a tear portion and a hinge portion is formed in a cabin interior side wall portion of the side garnish. In the event of a vehicle collision, the inflating airbag opens up the airbag door while tearing the tear portion from inside the case. As a consequence, the airbag is inflated and deployed towards the vehicle front side between a vehicle occupant sitting in the rear seat and the vehicle side portion.

However, in the structure disclosed in JP-A No. 2006-088850, because the side airbag device is located in a position which is comparatively close to the vehicle occupant in the vehicle front-rear direction, when the airbag is inflated and deployed, the portion of the airbag where the dimension thereof in the vehicle width direction (hereinafter, referred to as the 'thickness' thereof) is at the maximum is located on the vehicle front side of the vehicle occupant. Because of this, there is a possibility that the ability of the airbag to restrain a vehicle occupant will be reduced. In order to counter this, relocating the design surface of the rear seat on the vehicle front side of the side garnish and moving the vehicle occupant towards the vehicle front side may be considered, however, because the side garnish and the design surface of the rear seat do not have a mutually continuous exterior, this would cause a deterioration in the exterior appearance of the design surface. Alternatively, relocating the side airbag device further to the vehicle rear side of the side garnish may also be considered, however, in small-sized vehicles and the like, because the wheel house is located adjacently to the side garnish, there is a possibility that it will not be possible to relocate the side airbag device on the vehicle rear side of the side garnish. Furthermore, adding a tether to the airbag so as to cause it to inflate in a flattish configuration, and thereby ensuring that the portion of the airbag having the maximum thickness is located at the side of the vehicle occupant may also be considered, however, the structure of the airbag in this case becomes extremely complex. Accordingly, JP-A No. 2006-088850 has considerable room for improvement regarding this point.

SUMMARY

An aspect of the present disclosure is a rear seat side airbag device that includes: an inflator that generates gas in the event of a vehicle collision; and a side airbag that is supplied with gas from the inflator from a position in a vehicle cabin side portion that corresponds to a rear seat, and that is inflated and deployed towards a portion on an outer side in a vehicle width direction of a vehicle occupant in a case in which the vehicle occupant is sitting in the rear seat.

BRIEF DESCRIPTION OF THE DRAWINGS

Exemplary embodiments of the present disclosure will be described in detail based on the following figures, wherein.

DETAILED DESCRIPTION

Hereinafter, an exemplary embodiment for implementing the present disclosure will be described in detail with reference to the drawings. Note that an arrow FR, an arrow OUT, and an arrow UP shown in the drawings respectively indicate a front side in a vehicle front-rear direction, an outer side in a vehicle width direction, and an upper side in a vehicle up-down direction.

Figure 1:
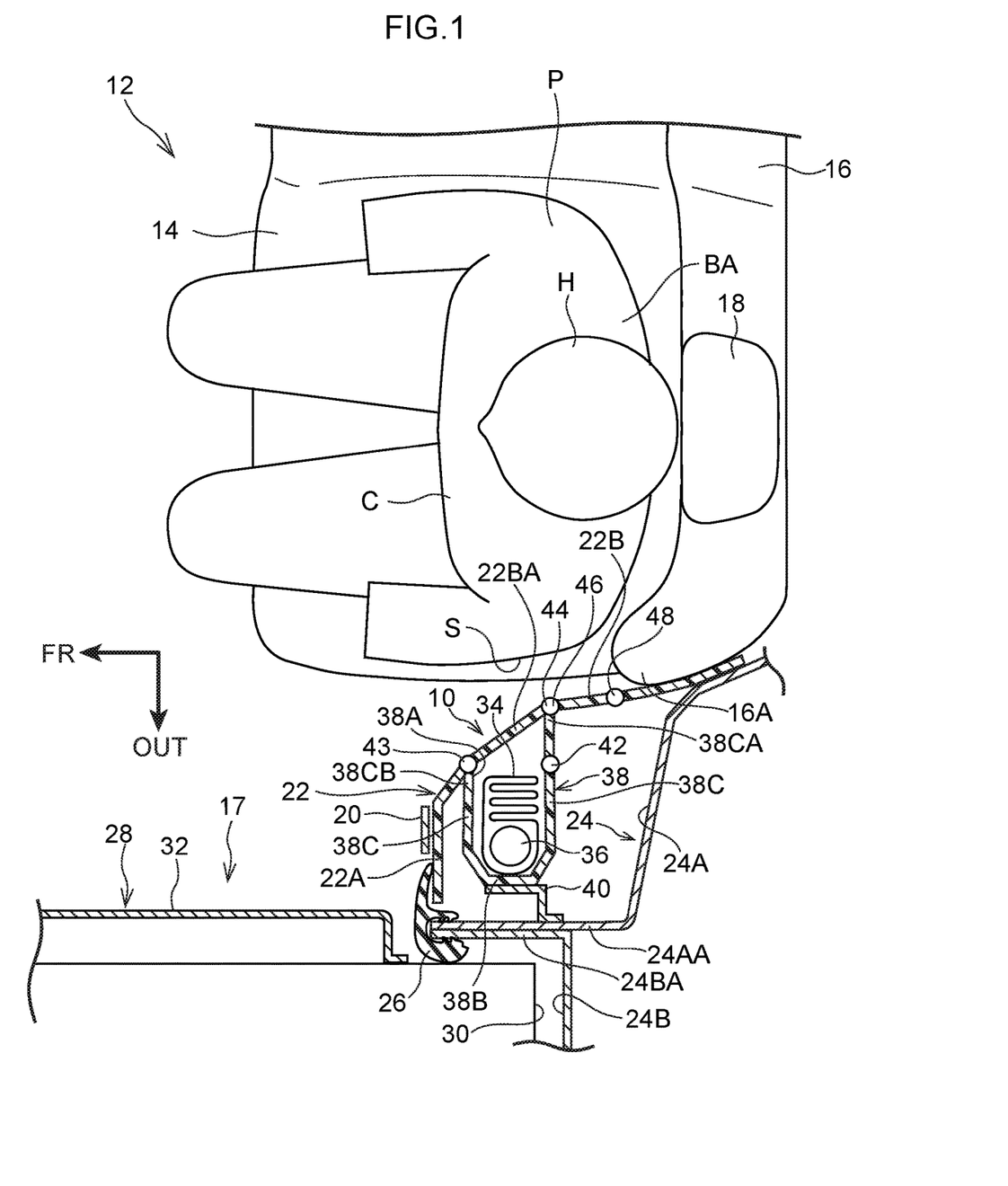
FIG. 1 is a schematic plan cross-sectional view showing the vicinity of a side garnish and a rear seat prior to a rear seat side airbag device according to an exemplary embodiment being operated.

A plan view as seen from a vehicle upper side of a rear seat 12 in which a rear seat airbag device 10 according to the present exemplary embodiment has been applied is shown in FIG. 1. Additionally, FIG. 1 shows a state in which a crash test dummy, which is serving as a model of a vehicle occupant requiring protection, is seated on a seat cushion 14 of the rear seat 12. For example, a World SID (Internationally Integrated Side Impact Dummy: World Side Impact Dummy) AF05 (i.e., the 5th percentile of American adult females) is used for the dummy. This dummy is seated in a standard sitting posture that is determined using a crash test method. The rear seat 12 is located in a standard set position that corresponds to the aforementioned sitting posture. In order to simplify the description, the dummy will be referred to hereinafter as a 'vehicle occupant P'.

As is shown in FIG. 1, the rear seat 12 is formed so as to include the rear cushion 14 and a seatback 16. A headrest 18 that supports a head portion H of the vehicle occupant P is provided in an upper end portion of the seatback 16. Additionally, webbing (i.e., a belt) 20 that restrains the vehicle occupant P is disposed at a side of the vehicle occupant P. The webbing 20 extends in the vehicle up-down direction, and one end portion of the webbing 20 is fixed to a belt anchor that is attached to a vehicle floor. Another end portion of the webbing 20 is wound around a retractor that is mounted on an upper back panel. The webbing 20 is also inserted through a tongue plate that is fitted into a buckle.

Here, a side garnish 22 is provided on the outer side in the vehicle width direction of the rear seat 12, in other words, at a position on a vehicle cabin side portion 17 that corresponds to the rear seat 12. The rear seat side airbag device 10 is fitted inside this side garnish 22. Note that only the side garnish 22 and the rear seat side airbag device 10 in the vehicle cabin side portion 17 on the vehicle left side are shown in FIG. 1, however, a side garnish 22 and a rear seat side airbag device 10 are provided in the same way in the vehicle cabin side portion on the vehicle right side as well. Because the rear seat side airbag device 10 on the vehicle right side and the rear seat side airbag device 10 on the vehicle left side have left-right symmetry, only the rear seat side airbag device 10 on the vehicle left side is described below.

The side garnish 22 is formed from resin and is provided between a side portion of the seatback 16 and a wheel house 24. The side garnish 22 has a cabin inner side wall portion 22A whose plate thickness direction extends substantially in the vehicle front-rear direction. The side garnish 22 also has a rear seat side wall portion 22B that extends towards the vehicle rearward side from an end portion on the inner side in the vehicle width direction of the cabin inner side wall portion 22A. As a consequence, a house inner 24A of the wheel house 24 is covered from the inner side in the vehicle width direction by the side garnish 22. In addition, the rear seat side airbag device 10 is also fitted inside the rear seat side wall portion 22B of the side garnish 22. The rear seat side airbag device 10 is described below in detail.

The wheel house 24 is formed so as to include the house inner 24A, which forms an inner plate, and a wheel house outer panel (hereinafter, referred to as a 'house outer') 24B, which forms an outer plate. Additionally, an inner side flange 24AA is formed on a front end portion of the house inner 24A. A trim seal 26 is attached to a join portion between the inner side flange 24AA and an outer side flange 24BA, which is formed on a front end portion of the house outer 24B.

A rear side-door 28 is disposed on the vehicle front side of the wheel house 24. The rear side door 28 is formed so as to include a door inner panel 30 which forms an inner plate, and a door outer panel which forms an outer plate. A door trim 32 made of resin, which is an interior finishing component, is attached to the vehicle inner side of the door inner panel.

The rear seat side airbag device 10 that is fitted in the side garnish 22 is disposed between the side garnish 22 and the wheel house 24. The rear seat side airbag device 10 is formed so as to include a side airbag 34, an inflator 36, and a case 38 that is mounted on the side garnish 22 and internally houses the side airbag 34 and the inflator 36. An aperture portion 38A (described below) of the case 38 is covered by the side garnish 22.

Figure 2:
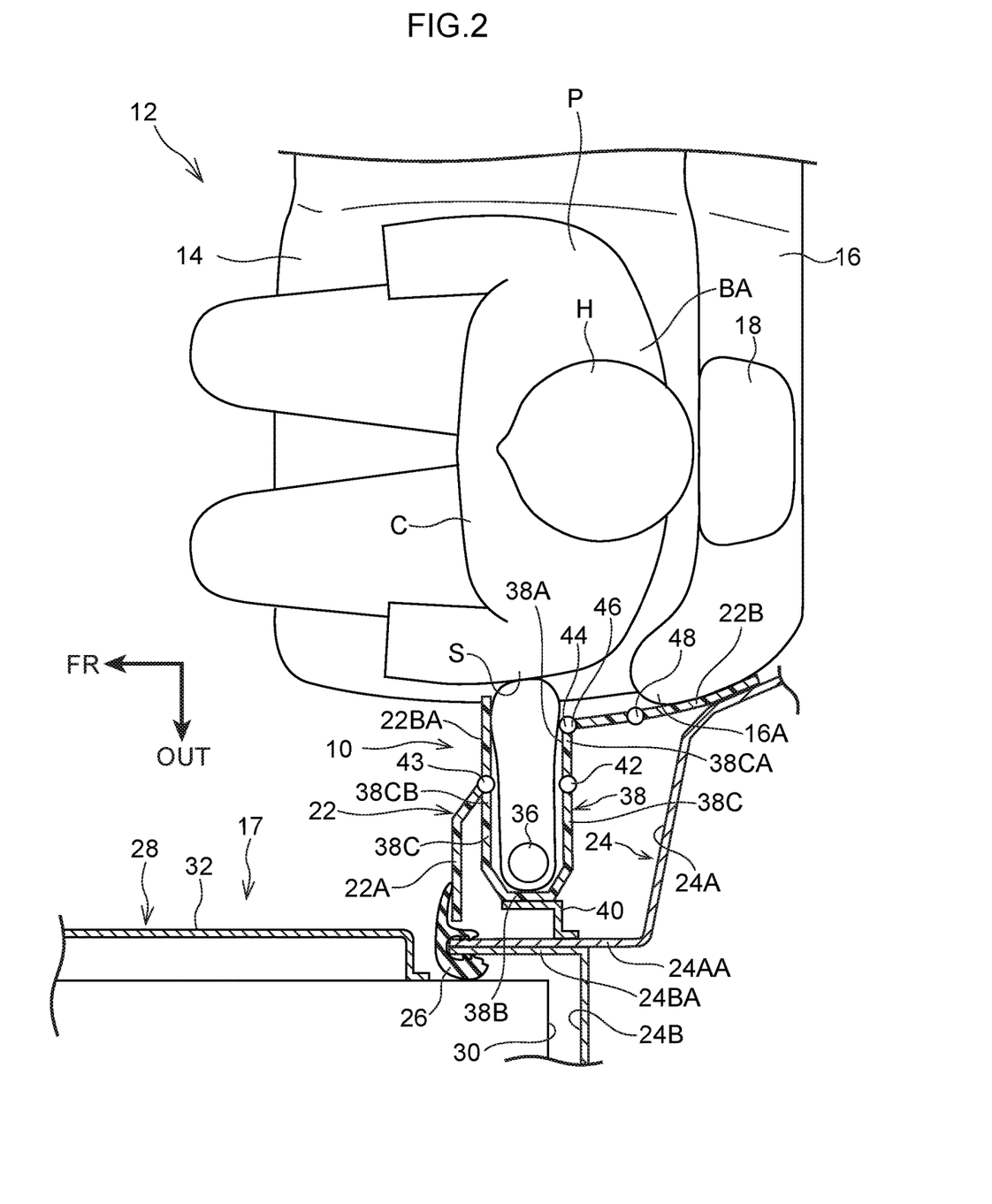
FIG. 2 is a schematic plan cross-sectional view corresponding to FIG. 1 showing an initial operating state of the rear seat side airbag device according to an exemplary embodiment.
Figure 3:
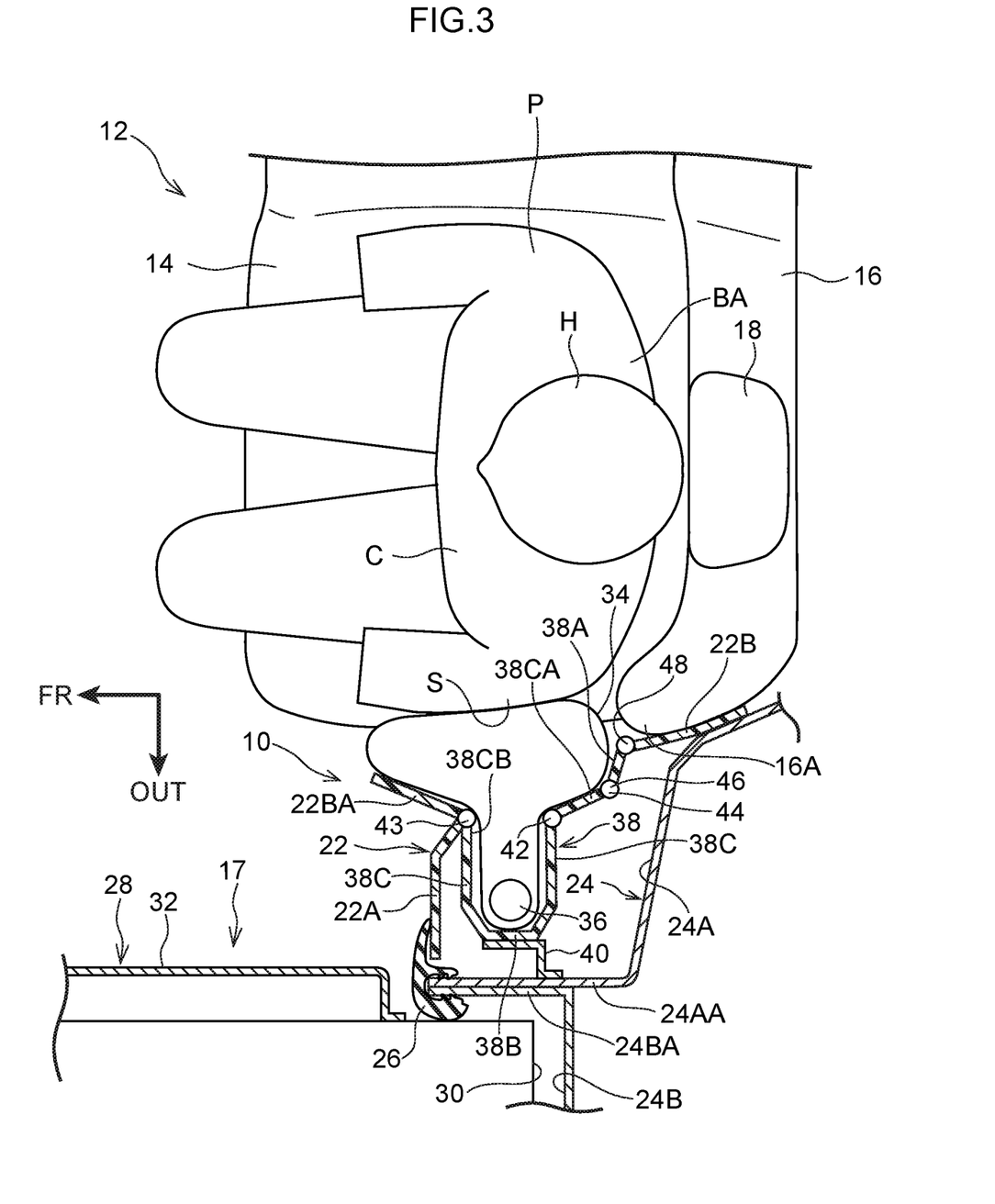
FIG. 3 is a schematic plan cross-sectional view corresponding to FIG. 1 showing a post-operation state of the rear seat side airbag device according to an exemplary embodiment.

The side airbag 34 is formed in a bag shape and, in the event of a vehicle collision, protects the vehicle occupant P by inflating and deploying towards a portion S on the outer side in the vehicle width direction of the vehicle occupant P (see FIG. 2 and FIG. 3). Prior to inflation and deployment, the side airbag 34 of the present exemplary embodiment is housed in a folded state inside the case 38. Note that the way in which the side airbag 34 is folded is not particularly restricted, and it may be folded in a spiral configuration or in a rolled-up configuration. The airbag 34 may also be housed inside the case 38 in an unfolded state.

A combustion-type or cold gas-type of inflator is employed as the inflator 36, and the gas generated when the inflator 36 is operated is supplied to the interior of the side airbag 34. In the present exemplary embodiment, the inflator 36 is a cylindrical inflator, and is disposed such that a longitudinal direction thereof extends substantially in the vehicle up-down direction. A plurality of gas injection ports are formed extending around a circumferential surface of a lower end portion of the inflator 36. When the inflator 36 is operated, gas is injected from the gas injection ports. Note that, in the present exemplary embodiment, the inflator 36 is formed in a cylinder shape, however, the present disclosure is not limited to this, and it is also possible for the inflator 36 to be formed in a disk shape.

Furthermore, the inflator 36 is electrically connected to an ECU (Electronic Control Unit) serving as a control unit and, in the event of a vehicle collision, the inflator 36 is operated by this ECU.

The case 38, which is disposed between the side garnish 22 and the wheel house 24, is formed in a box shape that is open on the inner side in the vehicle width direction (i.e., that has the aperture portion 38A on the inner side in the vehicle width direction). The aperture portion 38A is disposed at a position that, when viewed from a vehicle side, includes an axial center CL of the body of the vehicle occupant P (see FIG. 4). Accordingly, the aperture portion 38A opens towards the inner side in the vehicle width direction. An upper wall and a lower wall are provided respectively on an upper end portion and a lower end portion of the case 38. The upper wall is disposed on the vehicle upper side of the side airbag 34 and the inflator 36, and forms an upper surface of the case 38. The lower wall is disposed on the vehicle lower side of the side airbag 34 and the inflator 36, and forms a lower surface of the case 38.

A bottom wall 38B that joins together rear ends of the upper wall and the lower wall is provided in the case 38 on an outer side in the vehicle width direction of the side airbag 34 and the inflator 36. This bottom wall 38B is formed so as to support the side airbag 34 when this is in a deployed state from the outer side in the vehicle width direction (see FIG. 3). Note that the inflator 36 is disposed substantially in a central portion in the vehicle front-rear direction of the bottom wall 38B. Furthermore, the bottom wall 38B of the case 38 and the house inner 24A are attached to each other via a bracket 40 so that, as a result, the case 38 is fixed to the wheel house 24.

A pair of side walls 38C extend from both end portions in the vehicle front-rear direction of the bottom wall 38B towards the inner side in the vehicle width direction. As a consequence, the pair of side walls 38C are disposed apart from each other, and also facing each other in the vehicle front-rear direction. Note that, of the pair of side walls 38C, an end portion 38CA on the inner side in the vehicle width direction of the side wall 38C that is located on the vehicle rear side is positioned on the inner side in the vehicle width direction relative to an end portion 38CB on the inner side in the vehicle width direction of the side wall 38C that is located on the vehicle front side.

A reduced-thickness hinge portion 42 is formed in the side wall 38C that is located on the vehicle rear side out of the pair of side walls 38C. This hinge portion 42 is formed extending rectilinearly substantially in the vehicle up-down direction when viewed from a vehicle side, and, as an example, is formed in substantially the same position in the vehicle width direction as the end portion 38CB on the inner side in the vehicle width direction of the side wall 38C located on the vehicle front side.

An airbag door portion 22BA that is formed in the rear seat side wall portion 22B of the side garnish 22 is disposed on the inner side in the vehicle width direction of the case 38. In other words, the end portions 38CA and 38CB on the inner side in the vehicle width direction of the pair of side walls 38C of the case 38 are each attached to the rear seat side wall portion 22B, and this portion between the end portion 38CA and the end portion 38CB forms the airbag door portion 22BA. The side airbag 34 and the inflator 36 are covered from the vehicle cabin side by this airbag door portion 22BA. A reduced-thickness hinge portion 43 is formed in an end portion on the vehicle front side of the airbag door portion 22BA. Additionally, a reduced-thickness tear portion 44 is also formed in an end portion on the vehicle rear side of the airbag door portion 22BA. The plate thickness of this tear portion 44 is formed more thinly than that of the hinge portion 43. Moreover, the tear portion 44 and the hinge portion 43 are formed at positions that correspond to the aperture portion 38A, more specifically, are formed such that they extend along outer edges of the aperture portion 38A. Furthermore, the tear portion 44 is formed in a C-shape when viewed substantially from a vehicle side, while the hinge portion 43 is formed in a straight line extending substantially in the vehicle up-down direction when viewed from a vehicle side. Consequently, when the tear portion 44 receives expansion pressure during the inflation and deployment of the side airbag 34 and is torn as a result, the hinge portion 34 functions as a hinge, so that the airbag door portion 22BA rotates open around the hinge portion 43 towards the inner side in the vehicle width direction and towards the vehicle front side (see FIG. 2 and FIG. 3).

A reduced-thickness hinge portion 46 is formed in a join portion between the end portion 38CA on the inner side in the vehicle width direction of the side wall 38C on the vehicle rear side of the case 38 and the rear seat side wall portion 22B of the side garnish 22. In the same way as the hinge portion 42, this hinge portion 46 is formed in a straight line extending substantially in the vehicle up-down direction when viewed from a vehicle side, and the plate thickness thereof is set substantially the same as the plate thickness of the hinge portion 42.

A reduced-thickness hinge portion 48 is formed on the vehicle rear side of the hinge portion 46 in the rear seat wide wall portion 22B of the side garnish 22. In the same way as the hinge portion 42, this hinge portion 48 is also formed in a straight line extending substantially in the vehicle up-down direction when viewed from a vehicle side, and the plate thickness thereof is set to substantially the same plate thickness as that of the hinge portion 42.

Figure 4:
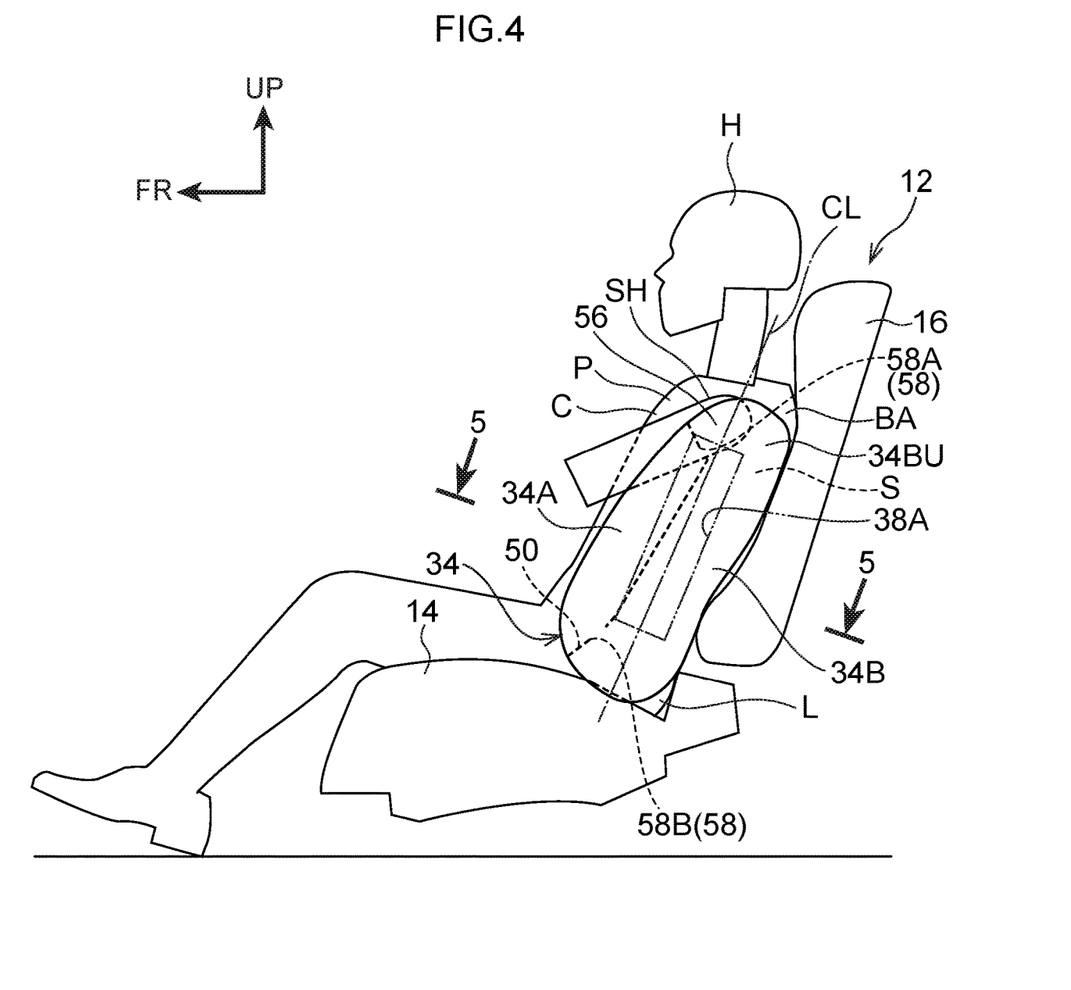
FIG. 4 is a vehicle side view showing a post-operation state of the rear seat side airbag device according to an exemplary embodiment.
Figure 5:
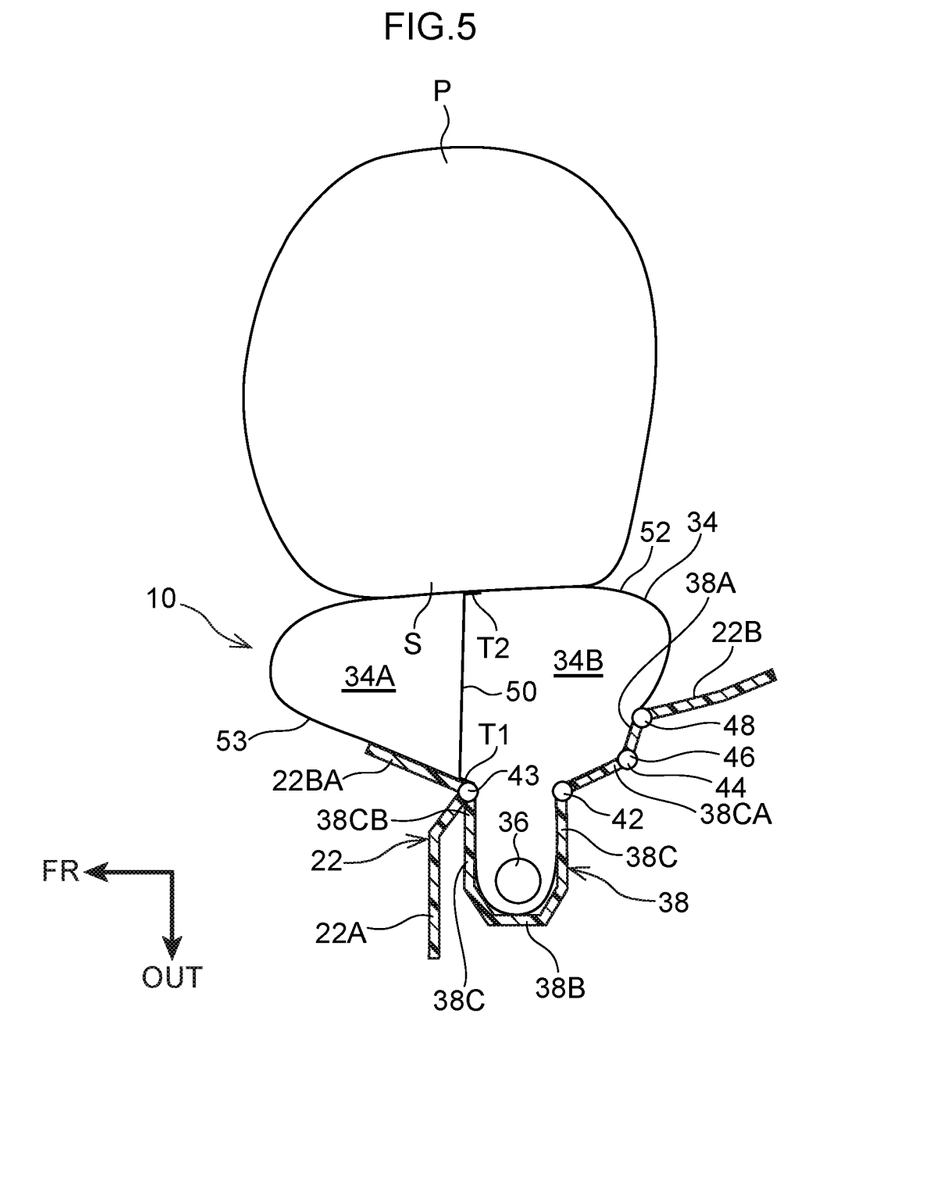
FIG. 5 is an enlarged cross-sectional view taken across a line 5-5 in FIG. 4 showing a post-operation state of the rear seat side airbag device according to an exemplary embodiment.

As is shown in FIG. 4, the interior of the side airbag 34 is partitioned by an internally provided tether 50 (i.e., a partitioning cloth), which serves as a partitioning portion, into a front-side chamber 34A and a rear-side chamber 34B. This tether 50 is formed in an elongated belt shape from the same fabric as that used to form the side airbag 34. One long edge portion of the tether 50 is sewn via a seam portion T1 (see FIG. 5) to a base cloth 53 that forms the outer side in the vehicle width direction of the side airbag 34, while another long edge portion thereof is sewn via a seam portion T2 (see FIG. 5) to a base cloth 52 that forms the inner side in the vehicle width direction of the side airbag 34.

When the side airbag 34 is in an inflated and deployed state, the tether 50 is set substantially in an inverted L shape when seen in a vehicle side view. More specifically, a lower end portion of the tether 50 slopes from a lower end portion of the side airbag 34 towards the rear side as it approaches the upper side, and a central portion in the up-down direction of the tether 50 extends in the height direction of the seatback 16 so as to substantially follow alongside a front edge portion (see FIG. 1, in other words, a support frame portion) of a side support portion 16A of the seatback 16. Additionally, an upper end portion of the tether 50 slopes from a front end portion of the side airbag 34 towards the rear side as it approaches the lower side. By forming the tether 50 in this shape, a shoulder portion restraining portion 56 that extends towards the front side is provided integrally with an upper portion 34BU of the rear side chamber 34B.

Inner vent holes 58, which serve as communicating holes, are formed in the tether 50. These inner vent holes 58 are formed by upper side inner vent holes 58A and lower side inner vent holes 58B. More specifically, the upper side inner vent holes 58A are formed in the sloping upper end portion of the tether 50, while the lower side inner vent holes 58B are formed in the lower end portion of the tether 50 which extends in an up-down direction. An interior of the front-side chamber 34A and an interior of the rear-side chamber 34B are in mutual communication via these upper side inner vent holes 58A and lower side inner vent holes 58B.

When this side airbag 34 is in an inflated and deployed state, the front-side chamber 34A of the side airbag 34 restrains a front portion side of the vehicle occupant P from a lower side portion of a shoulder portion SH as far as a hip portion L thereof, while the rear-side chamber 34B restrains a rear portion side of the vehicle occupant P from the shoulder portion SH as far as the hip portion L thereof.

(Actions and Effects)

Actions and effects of the present exemplary embodiment will now be described using a comparative example shown in FIG. 6 and FIG. 7. Note that component elements having the same structure as in the present exemplary embodiment are given the same reference symbols and any description thereof is omitted.

Figure 6:
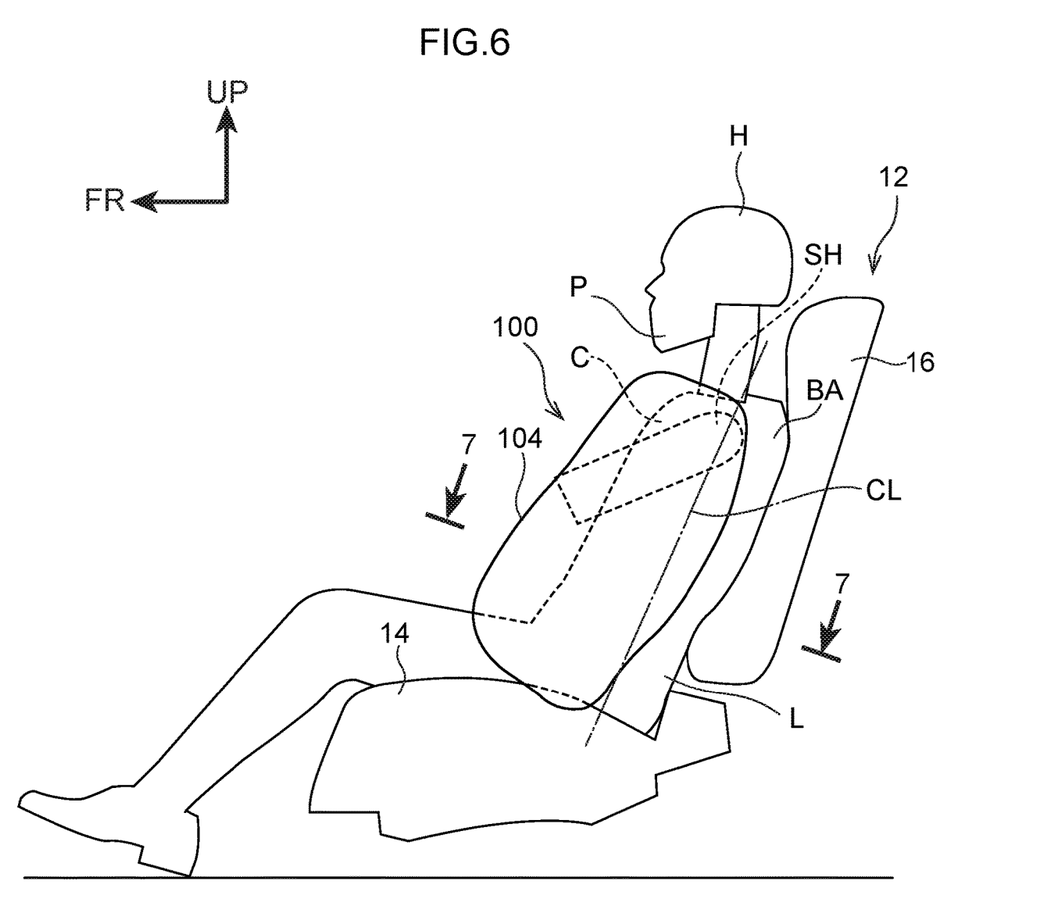
FIG. 6 is a vehicle side view showing a post-operation state of a rear seat side airbag device according to a comparative example.
Figure 7:
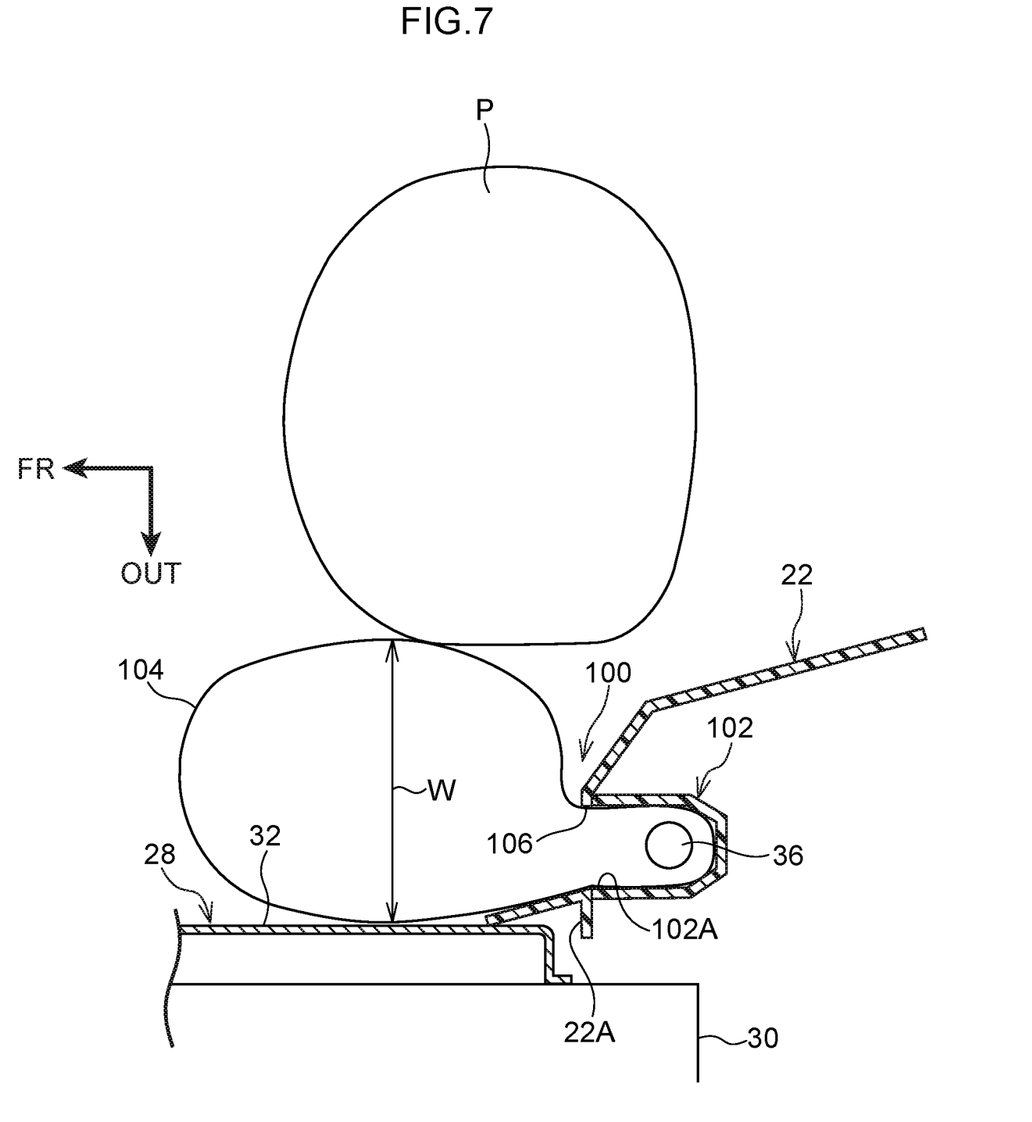
FIG. 7 is an enlarged cross-sectional view taken across a line 7-7 in FIG. 6 showing a post-operation state of the rear seat side airbag device according to a comparative example.

As is shown in FIG. 7, a rear seat side airbag device 100 is mounted on a cabin interior side wall portion 22A of the side garnish 22. This rear seat side airbag device 100 has a case 102. An aperture portion 102A that opens towards the cabin interior side wall portion (i.e. towards the vehicle front side) 22A is formed in the case 102, and is attached to the cabin interior side wall portion 22A. A side airbag 104 that, in the event of a vehicle collision, is inflated and deployed towards the vehicle front side at a side of the vehicle occupant P is housed inside the case 102 together with an inflator 36 that supplies gas to the interior of the side airbag 104. In the event of a vehicle collision, the inflating side airbag 104 opens up the airbag door portion 22BA while tearing the tear portion 106 from inside the case 102. As a result, the side airbag 104 is inflated and deployed between the vehicle occupant P sitting in the rear seat 12 (see FIG. 6) and the door trim 32.

However, because the rear seat side airbag device 100 is situated in a comparatively close position in the vehicle front-rear direction relative to the vehicle occupant, when the side airbag 104 is inflated and deployed during a vehicle collision, it inflates and deploys on the vehicle cabin front side of the axial center CL of the body of the vehicle occupant P (see FIG. 6). Accordingly, because a portion W of the side airbag 104 having the maximum thickness is positioned on the vehicle front side of the vehicle occupant P (i.e., because the thickness of the side airbag 104 is the thinnest at the side of the vehicle occupant P), there is a possibility that the ability to restrain the vehicle occupant P will be reduced.

In contrast to this, according to the present exemplary embodiment, as is shown in FIG. 1, the rear seat side airbag device 10 has the inflator 36 and the side airbag 34 and, as is shown in FIG. 2 and FIG. 3, of these, the side airbag 34 is supplied with gas from the inflator 36 and is inflated and deployed from a position on the vehicle cabin side portion 17 that corresponds to the rear seat 12 (i.e., on the side garnish 22) towards a portion S on the outer side in the vehicle width direction of the vehicle occupant P who is sitting in the rear seat 12. Accordingly, compared with a structure in which a side airbag is inflated and deployed towards the vehicle front side, as is the case in the comparative example, in the event of a vehicle collision, the vehicle occupant P can be rapidly restrained. As a consequence, the ability to restrain the vehicle occupant P can be improved.

Moreover, the rear seat side airbag device 10 has the case 38 that internally houses the inflator 36 and the side airbag 34 in a folded state. As is shown in FIG. 4, the aperture portion 38A, which opens towards the inner side in the vehicle width direction and expands when the side airbag 34 is being inflated and deployed, is formed in the case 38. Moreover, this aperture portion 38A is disposed in a position which is superimposed on an axial center CL of the body of the vehicle occupant P sitting in the rear seat when viewed from a vehicle side. Accordingly, the side airbag 34 can be inflated and deployed at this position which is superimposed on the axial center CL of the body of the vehicle occupant P. As a consequence, the ability to restrain the vehicle occupant P can be improved even more.

Furthermore, the case 38 is mounted on the side garnish 22 that is disposed at a position in the vehicle cabin side portion which corresponds to the rear seat. In this case, as is shown in FIG. 3, the portion of this side garnish 22 which is adjacent to the aperture portion 38A of the case 38, and also the case 38 are deformed such that the size in the vehicle front-rear direction of the aperture portion 38A when the side air bag 34 is inflated and deployed is enlarged, and also such that a supporting surface is formed that supports the side airbag 34 from the outer side in the vehicle width direction.

In other words, as is shown in FIG. 2, when a vehicle collision occurs resulting in the inflator 36 being operated, gas is supplied to the interior of the side airbag 34. As a consequence, the side airbag 34 inflates towards the inner side in the vehicle width direction along the pair of side walls 38C of the case 38. The tear portion 44 is torn by the expansion pressure in the side airbag 34, resulting in the airbag door 22BA opening around the hinge portion 43 towards the inner side in the vehicle width direction and towards the vehicle front side.

Next, as the gas continues to be supplied from the inflator 36 to the interior of the side airbag 34, the side wall 38C on the vehicle rear side of the case 38 receives expansion pressure towards the vehicle rear side from the side airbag 34. As a consequence, as is shown in FIG. 3, the portion of the side wall 38C on the vehicle rear side that is located between the hinge portion 46 and the hinge portion 42 is displaced around the hinge portion 42 towards the vehicle rear side and towards the outer side in the vehicle width direction. As a consequence, the portion of the side wall 38C on the vehicle rear side that is located between the hinge portion 46 and the hinge portion 42 forms a supporting surface whose surface normal direction extends substantially in the vehicle width direction, and that supports the side airbag 34 from the outer side in the vehicle width direction. Moreover, in conjunction with the displacement of the side wall 38C, the portion of the rear seat side wall portion 22B of the side garnish 22 that is located between the hinge portion 46 and the hinge portion 48 is also displaced around the hinge portion 48 towards the outer side in the vehicle width direction and towards the vehicle rear side. As a consequence, the surface normal direction of the portion of the rear seat side wall portion 22B that is located between the hinge portion 46 and the hinge portion 48 extends substantially in the vehicle front-rear direction, and the size of the aperture portion 38A in the vehicle front-rear direction is enlarged.

Because, as a result of the above-described deformation, the side airbag 34 is inflated and deployed towards the portion S on the outer side in the vehicle width direction of the vehicle occupant P via the aperture portion 38A whose size in the vehicle front-rear direction has been enlarged, the side airbag 34 is able to inflate and deploy more easily than when it inflates and deploys via an aperture portion 38A having a non-enlarged size in the vehicle front-rear direction. Additionally, because the inflated and deployed side airbag 34 is able to receive reaction force towards the inner side in the vehicle width direction from the portion, which is located between the hinge portion 46 and the hinge portion 42, of the side wall 38C on the vehicle rear side that has been displaced such that the surface normal direction thereof extends substantially in the vehicle width direction, the vehicle occupant P can be restrained more reliably.

Furthermore, as a result of the above-described deformation of the case 38 and the side garnish 22, the side airbag 34 is inflated and deployed over a range that includes the vehicle rear side of the aperture portion 38A. Accordingly, the side airbag 34 is able to directly restrain the rear side of the chest portion C and the back BA of the vehicle occupant P, which is where the resistance value against a load is the highest (see FIG. 4).

Furthermore, the side airbag 34 is formed so as to be supported during inflation and deployment from the outer side in the vehicle width direction by the bottom wall 38B of the case 38. Accordingly, the size of the side airbag 34 can be made more compact than the size of the side airbag 104 of the comparative example, which is inflated and deployed towards the vehicle front side and fills the space between the vehicle occupant P and the vehicle cabin side portion 17 (i.e., the door trim 32). This factor contributes to a reduction in costs.

Moreover, the case 38 is mounted on the side garnish 22, and the side garnish 22 covers the house inner 24A. Typically, when the space between the house inner 24A and the side garnish 22 is small, as is the case in a compact car, if the case 38 is mounted on the side garnish 22, then it is inevitable that the case 38 will be located in a comparatively close position in the vehicle front-rear direction to the vehicle occupant P sitting in the rear seat 12. Consequently, when the side airbag 34 is inflated and deployed, the portion of the side airbag 34 having the maximum thickness is located further to the vehicle front side than the vehicle occupant P. Because of this, there is a possibility that the ability of the side airbag to restrain the vehicle occupant P will be reduced. In contrast to this, in the present exemplary embodiment, because the side airbag 34 is inflated and deployed towards the portion S on the outer side in the vehicle width direction of the vehicle occupant P, any reduction in the ability to restrain the vehicle occupant P is largely prevented even if there is only a narrow space between the house inner 24A and the side garnish 22. As a consequence, the ability to restrain the vehicle occupant P is improved even in a compact car.

Furthermore, as a result of the interior of the side airbag 34 being partitioned by the tether 50, the side airbag 34 is provided with the rear-side chamber 34, which is disposed on the vehicle rear side of the tether 50, and the front-side chamber 34A, which is disposed on the vehicle front side of the tether 50. The inflator 36 is housed inside the rear-side chamber 34B, and the rear-side chamber 34B and the front-side chamber 34A are in mutual communication via the upper-side inner vent hole 58A and the lower-side inner vent hole 58B that are formed in the tether 50. Accordingly, as a result of the rear-side chamber 34B being directly supplied with gas from the inflator 36, the pressure therein is higher than in the front-side chamber 34A. Because of this, it is possible to restrain the rear side of the chest portion C and the back BA of the vehicle occupant P, which is where the resistance value against a load is the highest, using the high-pressure rear-side chamber 34B, and to restrain the front side of the chest portion C of the vehicle occupant P, which is where the resistance value against a load is the lowest, using the low-pressure front-side chamber 34A. As a consequence, the vehicle occupant P can be appropriately restrained using the side airbag 34 which has varying internal pressures so as to match the locations where the resistance values of the vehicle occupant P differ.

Moreover, by providing the tether 50 inside the side airbag 34, when the side airbag 34 is inflated and deployed, when looked at in a vehicle plan view, the front-side chamber 34A and the rear-side chamber 34B expand towards the vehicle occupant P side relative to the tether 50. In other words, the portion of the side airbag 34 that corresponds to the tether 50 forms what might be called a valley, and the vehicle occupant P can be held easily as a result of this valley being formed. As a consequence, the ability to restrain the vehicle occupant P is improved even more.

Furthermore, because the side airbag 34 is inflated and deployed towards the portion S on the outer side in the vehicle width direction of the vehicle occupant P, when the side airbag 34 is being inflated and deployed, any impediment to this inflation and deployment caused by the webbing 20 can be largely prevented.

Note that, in the present exemplary embodiment, a structure is employed in which the rear seat side airbag device 10 is provided in the side garnish 22, however, the present disclosure is not limited to this, and it is also possible for the rear seat side airbag device 10 to be provided in a base component in a side seat that is serving as an interior finishing component and that is disposed in the vehicle cabin side portion 17 relative to the seatback 16 of the rear seat 12 and is fixed to the vehicle body, and that has the base component, a pad that covers this base component from the vehicle cabin inner side, and a surface covering material that covers the pad from the vehicle cabin inner side. The rear seat side airbag device 10 may also be provided in a component other than this.

Additionally, a structure is employed in which, when the side airbag 34 is being inflated and deployed, the portion of the side garnish 22 which is adjacent to the aperture portion 38A of the case 38, and also the case 38 are deformed with the reduced-thickness hinge portions 42, 46, and 48 forming what may be called deformation starting point portions, however, the present disclosure is not limited to this. It is also possible to instead provide a structure in which ribs or the like are provided in portions other than the deformation starting point portions so that deformation occurs as a result of stress becoming concentrated in the deformation starting point portions. Alternatively, deformation may be generated by employing a structure other than these.

The present disclosure is not limited to the above-described exemplary embodiments, and various additions, modifications, and improvements may be made thereto insofar as they do not depart from the spirit or scope of the present disclosure.

It is an object of the present disclosure to provide a rear seat side airbag device that provides an improved ability to restrain a vehicle occupant.

A first aspect is a rear seat side airbag device that includes: an inflator that generates gas in the event of a vehicle collision; and a side airbag that is supplied with gas from the inflator from a position in a vehicle cabin side portion that corresponds to a rear seat, and that is inflated and deployed towards a portion on an outer side in a vehicle width direction of a vehicle occupant in a case in which the vehicle occupant is sitting in the rear seat.

According to the first aspect, a rear seat side airbag device has an inflator and a side airbag. Of these, the inflator generates gas in the event of a vehicle collision. Moreover, in the event of a vehicle collision, the side airbag is supplied with gas from the inflator from a position in the vehicle cabin side portion that corresponds to the rear seat, and is inflated and deployed towards a portion on the outer side in the vehicle width direction of a vehicle occupant sitting in the rear seat. Typically, a side airbag is inflated and deployed towards the vehicle front side between a vehicle cabin side portion and a vehicle occupant, however, in the present disclosure, because the side airbag is inflated and deployed towards a vehicle occupant from a position of the vehicle cabin side portion that corresponds to the rear seat, a vehicle occupant can be restrained rapidly in the event of a vehicle collision.

A second aspect is the rear seat side airbag device of the first aspect that further includes: a case that internally houses the inflator and the side airbag in a folded state, wherein in the case, an aperture portion that opens towards an inner side in the vehicle width direction and that expands in a case in which the side airbag is inflated and deployed is formed at a position that is superimposed on an axial center of a body of the vehicle occupant in a case of being viewed from a vehicle side.

According to the second aspect, a rear seat side airbag device has a case, and the inflator and the side airbag which is in a folded state are housed inside this case. An aperture portion that opens towards the inner side in the vehicle width direction, and expands when the side airbag is inflated and deployed is formed in this case. When viewed from a vehicle side, this aperture portion is disposed in a position which is superimposed on an axial center of the body of a vehicle occupant sitting in the rear seat. Accordingly, the side airbag can be inflated and deployed towards this position which is superimposed on the axial center of the body of a vehicle occupant when viewed from a vehicle side.

Here, the term 'axial center of the body of a vehicle occupant' refers to both a central portion in the vehicle front-rear direction of an upper torso portion of a vehicle occupant seated in a rear seat, and a central portion in the vehicle front-rear direction of an upper torso portion of a collision test dummy.

A third aspect is the rear seat side airbag device of the second aspect, wherein the case is mounted on a base component of a side seat or on a seat side garnish that is disposed between the vehicle cabin side portion and a seatback of the rear seat and that is fixed to the vehicle cabin side portion, and the case, and either a portion of the seat side garnish on which the case is mounted that is close to the aperture portion or a portion of the base component on which the case is mounted that is close to the aperture portion, are deformed in a case in which the side airbag is being inflated and deployed such that a size in a vehicle front-rear direction of the aperture portion is enlarged, and such that a supporting surface is formed that supports the side airbag from the outer side in the vehicle width direction.

According to the third aspect, the case is mounted either on a side garnish that is disposed in a position in the vehicle cabin side portion which corresponds to the rear seat, or on a base component of a side seat. Here, if the case is mounted on a side garnish, then the portion of this side garnish which is adjacent to the aperture portion of the case, and also the case are deformed such that the size in the vehicle front-rear direction of the aperture portion when the side air bag is inflated and deployed is enlarged, and also such that a supporting surface that supports this side airbag from the outer side in the vehicle width direction is formed. Accordingly, because the side airbag inflates and deploys from the aperture portion whose size has been enlarged in the vehicle front-rear direction towards a portion on the outer side in the vehicle width direction of a vehicle occupant, the side airbag inflates and deploys more easily than if the side airbag is inflated and deployed from an aperture portion having a small size in the vehicle front-rear direction. Moreover, because the inflated and deployed side airbag is able to receive reaction force from the supporting surface towards the inner side in the vehicle width direction, a vehicle occupant can be restrained more reliably.

On the other hand, when the case is mounted on a base component of a side seat, then in the same way as for the above-described side garnish, the portion of base component which is adjacent to the aperture portion of the case, and also the case are deformed such that the size in the vehicle front-rear direction of the aperture portion when the side air bag is inflated and deployed is enlarged, and also such that a supporting surface that supports this side airbag from the outer side in the vehicle width direction is formed. Accordingly, when the case is mounted on a base component of a side seat as well, the side airbag can be inflated and deployed more easily, and a vehicle occupant can be restrained more reliably.

Here, the term 'side seat' refers to an interior finishing component that is disposed in a vehicle side portion of a rear seat relative to a seatback and is fixed to the vehicle body, and has a base component, an elastic component that covers the base component from the vehicle cabin inner side, and a surface covering material that is provided on the vehicle cabin inner side of the elastic component.

A fourth aspect is the rear seat side airbag device of the third aspect, wherein a portion of the case that is located on the vehicle rear side of the aperture portion, and either a portion of the seat side garnish on which the case is mounted that is located closer to the vehicle rear side than the aperture portion or a portion of the base component on which the case is mounted that is located closer to the vehicle rear side than the aperture portion, are deformed in a case in which the side airbag is being inflated and deployed such that a size in a vehicle front-rear direction of the aperture portion is enlarged.

According to the fourth aspect, because a portion of the case on the vehicle rear side of the aperture portion, and either a portion of the side garnish on which the case is mounted that is located on the vehicle rear side of the aperture portion or a portion of the base component on which the case is mounted that is located on the vehicle rear side of the aperture portion are deformed such that the size in the vehicle front-rear direction of the aperture portion when the side airbag is inflated and deployed is enlarged, the side airbag is inflated and deployed over a range that includes the vehicle rear side of the aperture portion. Accordingly, the side airbag is able to directly restrain the rear side of the chest portion as well as the back of a vehicle occupant, which is where the resistance value against a load is the highest.

A fifth aspect is the rear seat side airbag device of the third or fourth aspect, wherein the case is mounted on the seat side garnish, which covers a wheel house inner panel.

According to the fifth aspect, the case is mounted on a side garnish, and the side garnish covers a wheel house inner panel (hereinafter, referred to as a 'house inner'). Typically, when a space between a house inner and a side garnish is small, as is the case in a compact car, if the case is mounted on the side garnish, then it is inevitable that the case will be located in a comparatively close position in the vehicle front-rear direction to a vehicle occupant sitting in a rear seat. Consequently, when the side airbag is inflated and deployed, the portion of the side airbag having the maximum thickness is located further to the vehicle front side than the vehicle occupant. Because of this, there is a possibility that the ability to restrain a vehicle occupant will be reduced. In contrast to this, in the present disclosure, because the side airbag is inflated and deployed towards a portion on the outer side in the vehicle width direction of a vehicle occupant, any reduction in the ability to restrain a vehicle occupant is largely prevented even if there is only a narrow space between the house inner and the side garnish.

A sixth aspect is the rear seat side airbag device of any of the first to the fifth aspect, wherein the side airbag includes an internal partitioning portion, a rear-side chamber that is disposed closer to the vehicle rear side than the partitioning portion and that accommodates the inflator therein, and a front-side chamber that is disposed closer to the vehicle front side than the partitioning portion and that communicates with the rear-side chamber via communicating holes that are formed in the partitioning portion.

According to the sixth aspect, as a result of an interior of the side airbag being partitioned by a partitioning portion, the side airbag is provided with a rear-side chamber which is disposed on the vehicle rear side of the partitioning portion, and a front-side chamber which is disposed on the vehicle front side of the partitioning portion. An inflator is housed inside the rear-side chamber, and the rear-side chamber and the front-side chamber are in mutual communication via communicating holes formed in the partitioning portion. Accordingly, as a result of the rear-side chamber being directly supplied with gas from the inflator, the pressure therein is higher than in the front-side chamber. Because of this, it is possible to restrain the rear side of the chest portion and the back of a vehicle occupant, which is where the resistance value against a load is the highest, using the high-pressure rear-side chamber, and to restrain the front side of the chest portion of a vehicle occupant, which is where the resistance value against a load is the lowest, using the low-pressure front-side chamber.

A rear seat side airbag device of the first aspect enables the ability to restrain a vehicle occupant to be improved.

A rear seat side airbag device of the second through fourth aspects enables the ability to restrain a vehicle occupant to be improved even further.

A rear seat side airbag device of the fifth aspect has the excellent effect that it enables the ability to restrain a vehicle occupant to be improved in a compact car.

A rear seat side airbag device of the sixth aspect enables a vehicle occupant to be appropriately restrained using chambers of a side airbag that have mutually different internal pressures so as to match the locations where the resistance values of the vehicle occupant differ.

What is claimed is:

1. A rear seat side airbag device comprising:
   an inflator that generates gas in an event of a vehicle collision;
   a side airbag that is supplied with the gas from the inflator from a position in a vehicle cabin side portion that corresponds to a rear seat, and, in a situation that a vehicle occupant is sitting in the rear seat, the side airbag is inflated and deployed from a portion disposed on an outer side of the rear seat in a vehicle width direction, toward an inner side in the vehicle width direction, and
   a case that internally houses the inflator and the side airbag in a folded state, wherein:
   in the case, an aperture portion that opens towards the inner side in the vehicle width direction and that expands in a situation in which the side airbag is inflated and deployed is formed at a position that is opposed to the vehicle occupant as viewed from a vehicle side,
   the case is mounted on a seat side garnish, the case and the seat side garnish disposed between the vehicle cabin side portion and a seatback of the rear seat, the seat side garnish covering a wheel house inner panel, and
   the case has an upper wall, a lower wall, a bottom wall that connects respective rear ends of the upper wall and the lower wall, and a pair of side walls that face each other and that are disposed apart from each other from both end portions in a front-rear direction of the bottom wall toward the inner side in the vehicle width direction.

2. The rear seat side airbag device according to claim 1, wherein
   the side airbag includes an internal partitioning portion, a rear-side chamber that is disposed closer to a vehicle rear side than the partitioning portion and that accommodates the inflator therein, and a front-side chamber that is disposed closer to a vehicle front side than the partitioning portion and that communicates with the rear-side chamber via communicating holes that are formed in the partitioning portion.

3. The rear seat side airbag device according to claim 1, wherein
   a vehicle width direction inner side end portion of a side wall of a vehicle rear side of the pair of side walls of the case is located more to the inner side along the vehicle width direction than the vehicle width direction inner side end portion of the side wall of a vehicle front side, and
   the aperture portion is covered with an airbag door portion of the seat side garnish.

4. The rear seat side airbag device according to claim 1, wherein
   the bottom wall of the case is configured to support the side airbag that is expanded from the vehicle width direction outer side, and
   the bottom wall of the case and the wheel house inner panel are connected via a bracket so that the case is fixed to the wheel house.

5. The rear seat side airbag device according to claim 1, wherein
   the case and a portion of the seat side garnish on which the case is mounted that is close to the aperture portion are deformed in a case in which the side airbag is being inflated and deployed such that a size in a vehicle front-rear direction of the aperture portion is enlarged, and such that a supporting surface is formed that supports the side airbag from the outer side in the vehicle width direction.

6. The rear seat side airbag device according to claim 5, further comprising:
   hinge portions that form deformation starting portions between portions of the case that are close to the aperture portion, and the case.

7. The rear seat side airbag device according to claim 5, wherein
   a portion of the case that is located on a vehicle rear side of the aperture portion, and a portion of the seat side garnish on which the case is mounted that is located closer to the vehicle rear side than the aperture portion are deformed in a case in which the side airbag is being inflated and deployed such that a size in a vehicle front-rear direction of the aperture portion is enlarged.

* * * * *